United States Patent
Campbell et al.

(10) Patent No.: US 7,663,770 B2
(45) Date of Patent: Feb. 16, 2010

(54) METHOD AND SYSTEM FOR SHOPPING FOR A CONSUMABLE FOR A DEVICE

(75) Inventors: Sarah E. Campbell, Rochester, NY (US); Ken Hayward, Brockport, NY (US); Marc J. Krolczyk, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 723 days.

(21) Appl. No.: 10/055,189

(22) Filed: Jan. 25, 2002

(65) Prior Publication Data

US 2003/0142338 A1 Jul. 31, 2003

(51) Int. Cl.
*G06F 15/00* (2006.01)
*B41F 1/00* (2006.01)

(52) U.S. Cl. .................. 358/1.15; 399/24; 705/26; 705/27; 705/28

(58) Field of Classification Search ................ 358/1.4, 358/1.14, 1.15; 399/12, 27, 8, 24; 347/50; 709/200, 204; 705/26, 27, 28, 29
See application file for complete search history.

(56) References Cited

U.S. PATENT DOCUMENTS

| | | | |
|---|---|---|---|
| 3,409,901 A | 11/1968 | Dost et al. | 347/122 |
| 4,468,112 A | 8/1984 | Suzuki et al. | 399/29 |
| 4,847,659 A | 7/1989 | Resch, III | 399/58 |
| 4,908,666 A | 3/1990 | Resch, III | 399/61 |
| 4,922,294 A | 5/1990 | Nakagami et al. | 399/10 |
| 4,961,088 A | 10/1990 | Gilliland et al. | 399/25 |
| 5,204,698 A | 4/1993 | LeSueur et al. | 399/25 |
| 5,204,699 A | 4/1993 | Birnbaum et al. | 347/140 |
| 5,272,503 A | 12/1993 | LeSueur et al. | 347/131 |
| 5,283,613 A | 2/1994 | Midgley, Sr. | 399/9 |
| 5,636,032 A | 6/1997 | Springett | 358/296 |
| RE35,751 E | 3/1998 | Midgley | 399/25 |
| 5,918,085 A | 6/1999 | Rollins et al. | 399/27 |
| 6,016,409 A | 1/2000 | Beard et al. | 473/278 |
| 6,106,088 A | 8/2000 | Wafler | 347/7 |
| 6,113,208 A * | 9/2000 | Benjamin et al. | 347/7 |
| 6,181,885 B1 | 1/2001 | Best et al. | 399/12 |

(Continued)

FOREIGN PATENT DOCUMENTS

EP 0 843 229 A2 5/1998

(Continued)

OTHER PUBLICATIONS www.officedepot.com http://web.archive.org/web/19981205011647/www.officedepot.com/.*

(Continued)

*Primary Examiner*—Kimberly A Williams (57) ABSTRACT

A method for shopping for one or more consumables for a device includes requesting with the device the identity of at least one supplier for the at least one consumable for the device, identifying the supplier for the consumable based on the request, and displaying with the device the identified supplier. A system for shopping for one or more consumables for a device includes a requesting system, an identification system, and a display system. The requesting system with the device requests the identity of at least one supplier for the consumable for the device. The identification system identifies the supplier for the consumable based on the request. The display system with the device displays the identified supplier.

30 Claims, 3 Drawing Sheets

U.S. PATENT DOCUMENTS

| | | | |
|---|---|---|---|
| 6,295,423 B1* | 9/2001 | Haines et al. ................ 399/24 |
| 6,333,790 B1* | 12/2001 | Kageyama ................ 358/1.15 |
| 6,405,178 B1* | 6/2002 | Manchala et al. ........... 705/29 |
| 6,529,692 B1* | 3/2003 | Haines et al. ................ 399/27 |
| 6,798,997 B1* | 9/2004 | Hayward et al. ............. 399/12 |
| 6,947,161 B2* | 9/2005 | Suyehira ................... 358/1.15 |
| 6,982,802 B2* | 1/2006 | Borg et al. ................ 358/1.15 |
| 7,031,013 B2* | 4/2006 | Parry et al. ................ 358/1.16 |
| 7,031,933 B2* | 4/2006 | Harper ....................... 705/26 |
| 7,124,097 B2* | 10/2006 | Claremont et al. ........... 705/26 |
| 7,233,909 B2* | 6/2007 | Smith et al. .................. 705/10 |
| 7,272,576 B2* | 9/2007 | Matsugi ...................... 705/29 |
| 7,483,159 B2* | 1/2009 | Tokutomo et al. ......... 358/1.15 |
| 2002/0008883 A1* | 1/2002 | Shibata ..................... 358/1.15 |
| 2002/0042747 A1* | 4/2002 | Istvan ......................... 705/26 |
| 2002/0054340 A1* | 5/2002 | Tokutomi et al. ......... 358/1.15 |
| 2002/0072998 A1* | 6/2002 | Haines et al. ................ 705/28 |
| 2002/0143642 A1* | 10/2002 | Harper ....................... 705/26 |
| 2002/0147657 A1* | 10/2002 | Callender et al. ............ 705/26 |
| 2008/0015944 A1* | 1/2008 | Nose et al. ................... 705/22 |
| 2008/0071626 A1* | 3/2008 | Hill ............................ 705/22 |
| 2008/0215454 A1* | 9/2008 | Haines et al. ................ 705/26 |
| 2009/0016743 A1* | 1/2009 | Tye et al. ...................... 399/8 |
| 2009/0070227 A1* | 3/2009 | Goffinet et al. .............. 705/26 |

FOREIGN PATENT DOCUMENTS

| JP | 10207669 A | 8/1998 |
|---|---|---|
| JP | 2000194640 A | 7/2000 |
| JP | 2000391379 A | 12/2000 |
| JP | 2001201022 A | 7/2001 |

OTHER PUBLICATIONS www.officedepot.com http://web.archive.org/web/20010603101827/www.officedepot.com/shop/catalog/default.asp?BC=3&ID=3&LEVEL=DV&PP=1.* www.officedepot.com http://web.archive.org/web/20010611103437/www.officedepot.com/shop/catalog/default.asp?BC=3:303&ID=303001&LEVEL=SC&PP=301.*

U.S. Appl. No. 09/397,125, filed Sep. 16, 1999, pending, Ken Hayward et al., entitled Context Sensitive Web-Based User Support.

U.S. Appl. No. 09/397,126, filed Sep. 16, 1999, pending, Ken Hayward et al., entitled Context Sensitive Web-Based User Support.

U.S. Appl. No. 09/662,198, filed Sep. 14, 2000, pending, Ken Hayward et al., entitled Supply Ordering Apparatus.

U.S. Appl. No. 09/662,284, filed Sep. 14, 2000, pending, Ken Hayward et al., entitled Method for Supply Ordering.

U.S. Appl. No. 09/740,505, filed Sep. 19, 2000, pending, Karl E. Kurz et al., entitled Method for Providing Information for a Customer Replacement Unit.

U.S. Appl. No. 09/740,603, filed Sep. 19, 2000, pending, Karl E. Kurz et al., entitled System for Providing Information for a Customer Replacement Unit.

J. Richard, "Lexmark Printer Supplies Monitor Acts As "Gas Gauge" For Inkjet Printers", http://reseller.lexmark.com/US/Corporate/Press/PressRelease/0,1196,709,00.html, retrieved Dec. 10, 2001.

* cited by examiner

METHOD AND SYSTEM FOR SHOPPING FOR A CONSUMABLE FOR A DEVICE

FIELD OF THE INVENTION

This invention generally relates to methods and systems for obtaining goods and, more particularly, to a method and system for shopping at a device for a consumable for the device.

BACKGROUND OF THE INVENTION

With devices, such as printers, copy machines, or facsimile machines, consumables, such as dry ink, a feed roll cartridge, a fuser module, a fuser web, or staples, will eventually run low or run out. When this occurs, an operator of the device typically will travel to some retail or supply stores, peruse various alternatives for the consumables, and eventually will elect to purchase the lowest cost consumable available in the desired quantity.

Unfortunately, there are several drawbacks to this process for supply or resupplying the device with consumables. For example, the process is very time consuming because typically an individual will have to travel to several different stores to check whether the stores even carry the particular consumable and if they do at what price and in what quantities. Additionally, with this process there is a chance that the operator may purchase the wrong type of consumable or consumables for the device. Further, the original manufacturer and original retailer have no influence on the operator's selection of a supplier or suppliers for the consumable or consumables. As a result, these sales may end up going to a competitor of the original manufacturer of the device.

SUMMARY OF THE INVENTION

A method and a computer readable medium having stored thereon instructions for shopping for at least one consumable for a device in accordance with embodiments of the present invention includes requesting with the device an identity of at least one supplier for the at least one consumable for the device, identifying the supplier for the consumable based on the request, and displaying with the device the identified supplier.

A system in accordance with embodiments of the present invention includes a requesting system, an identification system, and a display system. The requesting system requests an identity of at least one supplier for the consumable for the device. The identification system identifies the supplier for the consumable based on the request. The display system with the device displays the identified supplier.

The present invention provides a method and system for shopping for at least one consumable for a device which is easy and efficient. Additionally, the present invention streamlines the process for shopping for the consumable or consumables by providing an operator of the device with shopping information, such as a list of suppliers of each of the consumables, the price of each consumable at each of the identified suppliers, the quantity of each consumables at each of the identified suppliers, and directions to each of the identified suppliers. This information is dynamic, real-time or substantially real time information about the consumable or consumables at each of the identified suppliers. Further, the present invention reduces the chance for an error in selecting the wrong consumable as a replacement because the device automatically identifies the appropriate consumable for the device purchase. In addition to these benefits, the present invention is also useful in helping to try and influence or direct sales for the consumable or consumables back to a particular retailer or retailers.

DETAILED DESCRIPTION OF THE INVENTION

Figure 1:
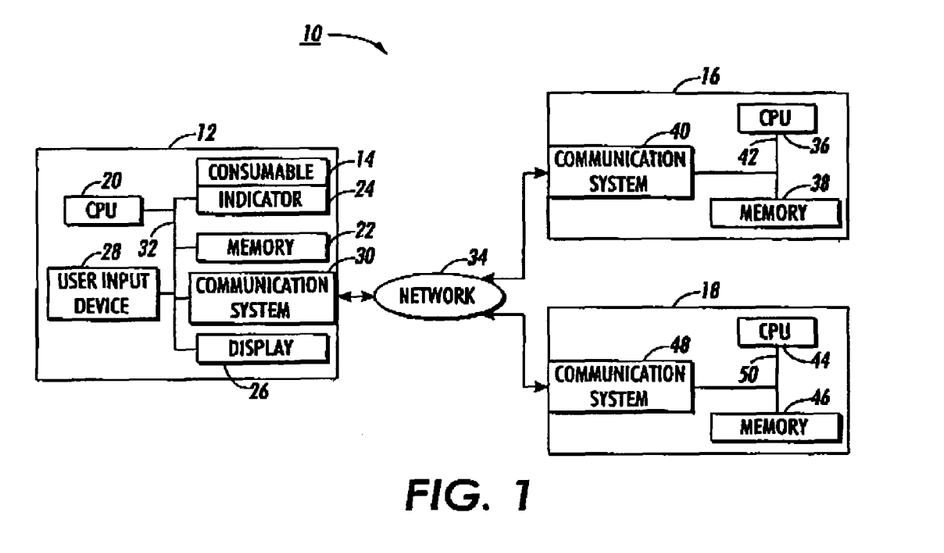
FIG. 1 is a block diagram of a system for shopping at a device for at least one consumable for the device in accordance with the present invention.

A system 10 for shopping at a printing device 12 for at least one consumable 14 for the printing device 12 in accordance with one embodiment of the present invention is illustrated in FIG. 1. This system 10 includes the printing device 12, a retailer system 16, and a supplier system 18. The method includes requesting with the printing device 12 device the identity of at least one supplier system 18 for the consumable 14, identifying the supplier system 18 for the consumable 14 based on the request, and displaying with the device 12 the identified supplier system 18. The present invention provides a method and system for shopping for at least one consumable 14 for a device, such as printing device 12, which is easy and efficient.

Referring to FIG. 1, in this particular embodiment, the printing device 12 is a printer, although a variety of different types of machines, apparatuses, or systems could be used instead of printing device 12, such as a copy machine or a facsimile machine. Additionally, in this particular embodiment, one consumable 14, such as an ink supply, a feed roll cartridge, a fuser module, a fuser web, or staples, is shown, although the number of consumables in a will depend on the particular type of device.

The printing device 12 includes a central processing unit (CPU) or processor 20, a memory 22, an indicator or indication system 24, a graphical user interface or display 26, a user input device 28, and a communication system 30 which are coupled together by a bus system or other link 32, respectively, although the printing device 12 may comprise other components, other numbers of the components, and other combinations of the components. Additionally, the printing device 12 may have other configurations, such as printer with a printer driver that is coupled to a plurality of personal computers via a network or other communications link and which interacts with at least one of the personal computers to shop for the consumable 14.

Figure 2:
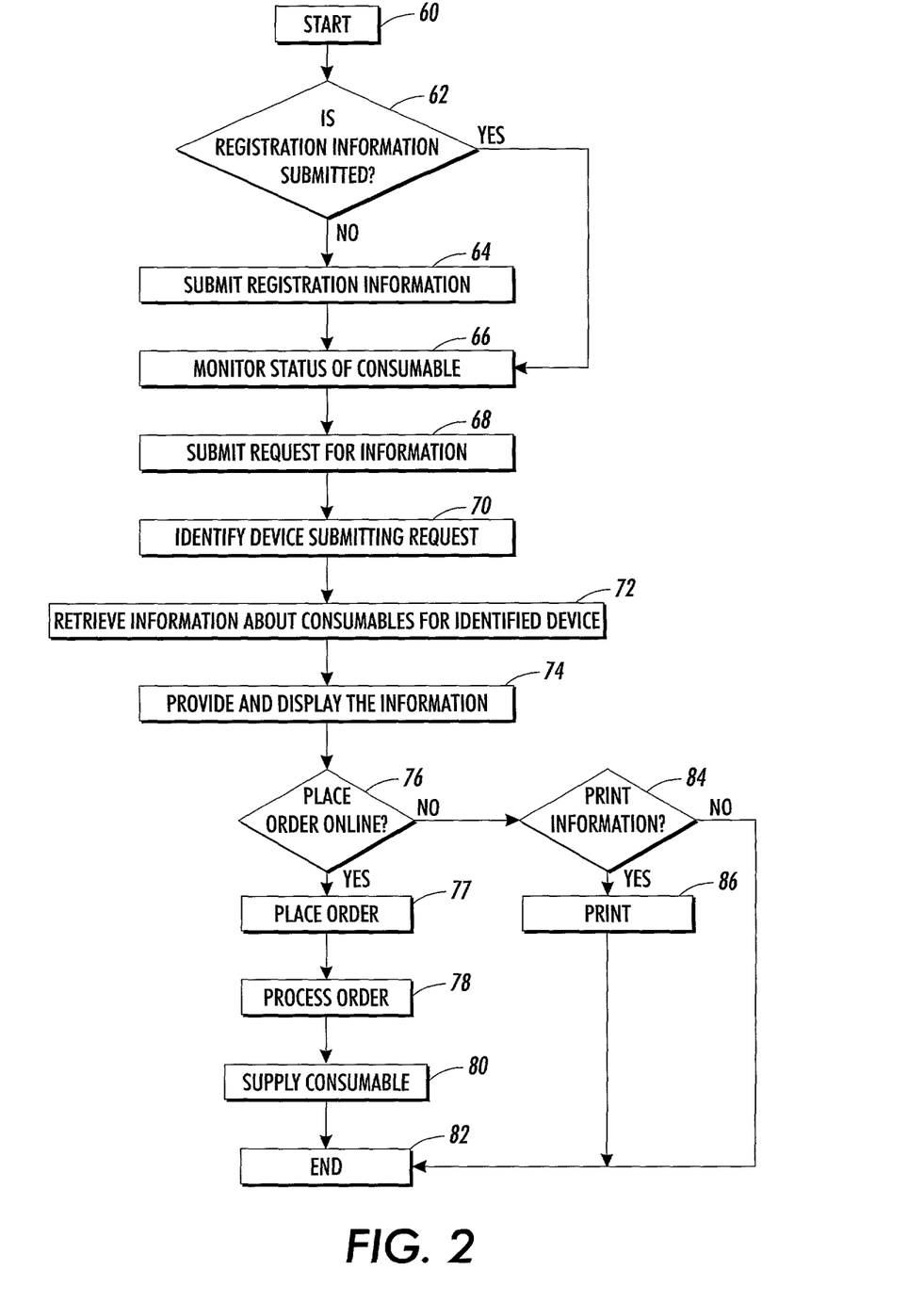
FIG. 2 is a flow chart of a method for shopping at a device for at least one consumable for the device in accordance with the present invention.

The processor 20 may execute one or more programs of stored instructions for at least a portion of the method for shopping for at least one consumable 14 in accordance with one embodiment of the present invention as described herein and illustrated in FIG. 2. In this particular embodiment, those programmed instructions executed by processor 20 are stored in memory 22 and are executed by processor 20, although some or all of those programmed instructions could be stored and retrieved from and also executed at other locations, such as in a personal computer coupled to a printer driver in a printer. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for memory 22.

The indication or monitor system 24 provides an indication of the status of the consumable 14, such as whether the consumable 14 is due for replacement, running low, or has run out. A variety of different types of indication systems can be used depending on the particular device and consumable being monitored.

Figure 3:
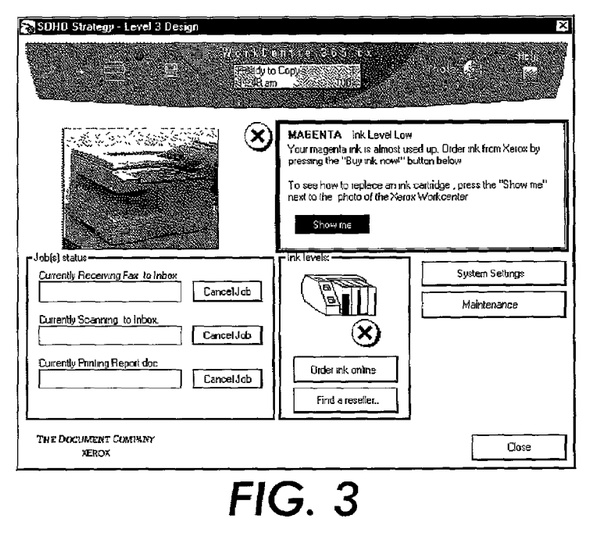
FIG. 3 is a screen shot of a status report of operations for the device.
Figure 4:
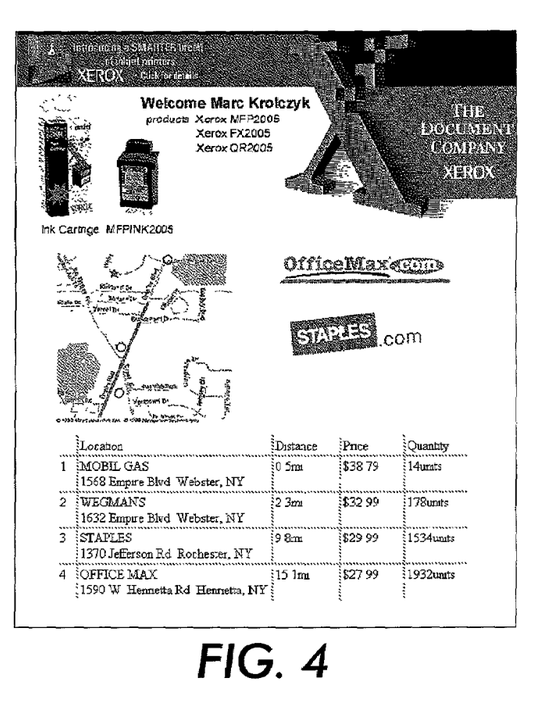
FIG. 4 is a print out of a screen shot of information report for shopping for a consumable for the device.

The graphical user interface 26 provides a display of the information to the operator, such as a screen shot of a status report of operations for the device in accordance with one example as shown in FIG. 3 or a print out of a screen shot of an information report for shopping for a consumable for the device in accordance with another example as shown in FIG. 4. A variety of different types of displays can be used such, such as a cathode ray tube display device. In this particular embodiment, the graphical user interface 26 is on the printing device 12, although the graphical user interface 26 could be at other locations, such as at a personal computer coupled to the printer driver of the printer.

Referring back to FIG. 1, the user input device 28 enables an operator to generate and transmit signals or commands to the processor 20, such as a request for information about suppliers or resellers of a consumable 14 or consumables that is needed. A variety of different types of user input devices can be used, such as a keyboard, keypad, on-screen touch pad, or computer mouse. In this particular embodiment, the user input device 28 is on the printing device 12, although the user input device 28 could be at other locations, such as at a personal computer coupled to the printer driver of the printer.

The communications system 30 is used by the printing device 12 to operatively couple and communicate to other systems and devices, such as the retailer system 16 and supplier system 18 via a communications network 34. A variety of different types of communications networks, such as a hard wired communication network system, a wireless communications network system, the Internet, a LAN, or a WAN, and a variety of different types of communication protocols can be used.

In this particular embodiment, the retailer system 16 is a computer processing system at the original retailer of the printing device 12, although the system 16 could be a variety of different types of machines, apparatuses, or systems at other locations, such as a computer processing system at the original manufacturer of the printing device 12.

The retailer system 16 includes a central processing unit (CPU) or processor 36, a memory 38, and a communication system 40 which are coupled together by a bus system or other link 42, respectively, although the retailer system 16 may comprise other components, other numbers of the components, and other combinations of the components. The processor 36 may execute one or more programs of stored instructions for at least a part of the method shopping for at least one consumable 14 in accordance with one embodiment of the present invention as described herein, such as identifying the printing device 12 making a request for information, identifying suppliers of a consumable or consumables for the printing device 12 or processing the received order for the consumable 14 or consumables. In this particular embodiment, those programmed instructions executed by processor 36 are stored in memory 38, although some or all of those programmed instructions data could be stored and retrieved from and also executed at other locations. Additionally, other data, such as information about the consumer who bought the printing device 12 and the quantity and price of the consumable 14 or consumables for the printing device 12 available at this retailer, may be also be stored in memory 38. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 36, can be used for memory 38. The communications system 40 is used by the retailer system 16 to operatively couple and communicate to other systems and devices, such as the printing device 12 or supplier system 18 via the communications network 34.

In this particular embodiment, the supplier system 18 is a computer processing system at a supplier of a consumable 14 or consumables for the printing device 12, although the system 16 could be a variety of different types of machines, apparatuses, or systems at other locations, such as a computer processing system at the original manufacturer of the printing device 12.

The supplier system 18 includes a central processing unit (CPU) or processor 44, a memory 46, and a communication system 48 which are coupled together by a bus system or other link 50, respectively, although the supplier system 18 may comprise other components, other numbers of the components, and other combinations of the components. The processor 44 may execute one or more programs of stored instructions for at least a part of the method shopping for at least one consumable 14 in accordance with one embodiment of the present invention as described herein, such as processing the received order for the consumable 14 or consumables from the retailer system 16 or the printing device 12 and supplying the consumable 14. In this particular embodiment, those programmed instructions executed by processor 44 are stored in memory 46, although some or all of those programmed instructions could be stored and retrieved from and also executed at other locations. Additionally, other data, such as information about the quantity and price of the consumable 14 or consumables for the printing device 12 available at this supplier, may be also be stored in memory 46. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 44, can be used for memory 46. The communications system 48 is used by the supplier system 18 to operatively couple and communicate to other systems and devices, such as the printing device 12 or retailer system 16 via the communications network 34.

A method for shopping for at least one consumable 14 for the printing device 12 in accordance with one embodiment of the present invention will now be described with reference to FIG. 2. In step 60, the method starts.

In step 62, a determination is made on whether the registration information, such as the name and address of the customer, the type of printing device 12 purchased, and the location where the printing device 12 was purchased, was submitted by the purchaser of the printing device 12 and entered into a database. Typically, when a consumer purchases a printing device 12 at a retailer, the customer will be asked to complete and submit a registration form, although the information can be obtained from the customer at other times and in other manners. If registration information has been submitted, then the Yes branch is taken to step 66. If registration information has not submitted, then the No branch is taken to step 64.

In step 64, the registration information for the printing device 12 is submitted by the customer of the printing device 12. This information can be submitted in a variety of different manners. For example, if registration information has not been completed or has been partially completed, when printing device 12 is turned on an operator of the printing device 12 may be prompted on the display 26 to enter the registration information using user input device 28. In this particular embodiment, this information is stored at in memory 38 in retailer system 16 for the original retailer of the printing device 12, although the information can be stored at other locations.

In step 66, the status of the consumable 14 in printing device 12 is monitored by indication system 24. Indication system 24 signals when replacement of the consumable 14 in printing device 12 is recommended, such as when the consumable 14 is running out or has run out. One example of this is illustrated in FIG. 3, which shows a notice in the upper right hand corner of the screen shot in display 26 that the magenta ink supply is almost used up. Again, although only one consumable 14 is illustrated in this particular embodiment, the printing device 12 may have multiple consumables which are monitored.

In step 68, a request for information about obtaining the consumable 14 or consumables for printing device 12 is submitted. A determination to make this request for information may be based on when the indication system 24 signals that replacement of the consumable 14 in printing device 12 is recommended or may simply be at the discretion of the operator of the printing device 12. Additionally, the submission of this request may require the affirmative action of an operator of the printing device 12 or may be triggered automatically, such as when the indication system 24 signals for obtaining a replacement. In this particular embodiment, a user input device 28, such as a button that triggers the submission of the request for information about obtaining the consumable 14, when pressed or clicked on, is used. One example of such a button entitled, "Find a reseller" is illustrated in the screen shot on display 26 in FIG. 3.

Referring back to FIG. 2, in step 70 the request for information is received by another system, such as retailer system 16, which retrieves information about the printing device 12 submitting the request, such as the particular type of device, the consumable 14 or consumables inquired about, and the location of the device. In this particular embodiment, the request for information is received by retailer system 16 which has the registration information for printing device 12 and other devices stored in memory, although the request could be received and processed by other systems. Additionally, if retailer system 16 does not have information about printing device 12, the request for the information about the consumable 14 or consumables may also contain information about the printing device 12 or the retailer system 16 may communicate with printing device 12 via communications network 34 to obtain the necessary information about the printing device 12.

In step 72, based on the information obtained about the printing device 12 making the request, shopping information regarding the consumable 14 or consumables is obtained, such as a one or more suppliers for each consumable 14, the price for each consumable 14 at each of the identified supplier, the quantity for each consumable 14 at each of the identified supplier, the location of each of the identified suppliers, and the store hours for each of the identified suppliers, although other types of information could be obtained.

In step 74, the shopping information is provided to the printing device 12 from the retailer system 16 via communications network 34 and is shown on display 26. One example of a print out of a screen shot on display 26 of the shopping information, with the names of suppliers for the consumable 14, the distance of each of the identified suppliers from printing device 12 along with a map, the price of the consumable 14 at each identified supplier, and the quantity of the consumable at each of the identified suppliers is illustrated in FIG. 4. A variety of different systems can be used to generate the maps. Accordingly, the present invention may influence the customer's purchasing decision, directing the customer to a particular supplier or suppliers.

In step 76, the operator of the printing device 12 may be requested to decide whether to place an order on-line for the consumable 14 or consumables based on the obtained shopping information. The indication to place an order can be made with user input device 28. If the operator decides to place an order on-line, then the Yes branch is taken to step 77.

In step 77, an order for the consumable 14 or consumables is placed by the printing device 12 via communications network to at least one of the identified suppliers, such as retailer system 16 or supplier system 18.

In step 78, the order for the consumable 14 or consumables is processed. In this particular embodiment, the order is processed by supplier system 18 which includes a processing an electronic payment for the consumable 14, although other systems could process the order, such as retailer system 16.

In step 80, the ordered consumable 14 or consumables are supplied to an address where the device is located or to another designated destination and then the method ends in step 82.

If back in step 76, the operator decides not to place an order on-line, then the No branch is taken to step 84. The indication not to place an order can be made with user input device 28.

In step 84, the operator of the printing device 12 may be requested to decide whether to print out the shopping information about the consumable 14 or consumables. The indication to print or not to print can be made with user input device 28. If the operator decides to print the shopping information, then the Yes branch is taken to step 86. If the operator decides not to print the shopping information, then the No branch is taken to step 82 where the method ends.

In step 86, the shopping information is printed out by the printing device 12. The printing device 12 may also print out other information, such as a coupon for use towards the purchase of the consumable 14 or consumables for selecting one of the identified suppliers. Once the shopping information is printed out, then the method ends in step 82

Accordingly, the present invention provides an easy and efficient way for an operator using the printing device 12 to obtain shopping information about a consumable 14 or consumables for the printing device 12 and, if desired, to order the consumable 14 or consumables for the printing device 12 based on the shopping information using the printing device 12. As a result, an individual does not have to call or travel to several different supply stores to obtain the shopping information. Additionally, the present invention reduces the likelihood that an error will be made in the type of consumable 14 being purchased since the information about the consumable 14 is obtained automatically be the printing device 12. If an individual simply went to different supply stores to shop for the consumable 14, the operator might obtain information about the wrong type of consumable for the printing device 12, such as the wrong type of ink cartridge.

The present invention also provides an effective method for influencing the purchasing decision of customers for a consumable 14 or consumables for the printing device 12. Operators of the printing device 12 will be directed away from suppliers that are competitors and to a list of desired suppliers for the consumable 14 or consumables. By way of example, some suppliers may be selling a consumable 14 or consumables that do not meet quality standards or other requirements for the device 12 and if purchased and used could damage the device 12. Additionally, the present invention provides the original manufacturer of the device 12 some leverage in placing a consumable 14 or consumables in certain stores.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method comprising:
   requesting, with a peripheral printing device via a communications network connected to the peripheral printing device, identity of a plurality of suppliers for at least one consumable for the peripheral printing device;
   receiving, at the peripheral printing device via the communications network, information identifying a plurality of suppliers for the at least one consumable in response to the request; and
   indicating, with the peripheral printing device, one of the identified plurality of suppliers to submit an order for the at least one consumable to the indicated supplier based on the received information, via the communication network,
   wherein the received information further comprises information identifying a quantity of the at least one consumable at each of the identified plurality of suppliers, and the method further comprising the step of displaying or printing each identified quantity of the at least one consumable.

2. The method as set forth in claim 1, further comprising indicating, at the peripheral printing device, when replacement of at least one of the consumables in the peripheral printing device is recommended, wherein the request is based on the indication of the recommended replacement.

3. The method as set forth in claim 1, wherein the received information further comprises information identifying a price of the at least one consumable at each of the identified plurality of suppliers, and the method further comprising the step of displaying or printing each identified price of the at least one consumable.

4. The method as set forth in claim 1, wherein the received information further comprises information identifying a location of each of the identified plurality of suppliers, and the method further comprising the step of displaying or printing each location of the identified plurality of suppliers.

5. The method as set forth in claim 1, further comprising:
   processing the submitted order; and
   supplying the at least one consumable for the peripheral printing device.

6. The method as set forth in claim 5, wherein the processing the submitted order further comprises receiving a payment for the at least one consumable.

7. The method as set forth in claim 1, comprising:
   receiving the request, and
   identifying the plurality of suppliers for the at least one consumable based on the received request.

8. The method as set forth in claim 7, further comprising retrieving information about the peripheral printing device making the request, wherein the identifying the plurality of suppliers is based on the retrieved information.

9. The method as set forth in claim 1, further comprising at least one of displaying said received identification information and printing said received identification information.

10. The method as set forth in claim 1, wherein the peripheral printing device is a device selected from a printer, a copy machine, and a facsimile machine.

11. A computer readable medium having stored thereon instructions for shopping for at least one consumable for a peripheral printing device which, when executed by at least one processor, cause the processor to perform the steps of:
    requesting, with a peripheral printing device via a communications network connected to the peripheral printing device, identity of a plurality of suppliers for at least one consumable for the peripheral printing device;
    receiving, at the peripheral printing device via the communications network, information identifying a plurality of suppliers for the at least one consumable in response to the request; and
    indicating, with the peripheral printing device, one of the identified plurality of suppliers to submit an order for the at least one consumable to the indicated supplier based on the received information, via the communication network,
    wherein the received information further comprises information identifying a quantity of the at least one consumable at each of the identified plurality of suppliers, and further comprising the step of displaying or printing each identified quantity of the at least one consumable.

12. The medium as set forth in claim 11, further comprising indicating, at the peripheral printing device, when replacement of at least one of the consumables in the peripheral printing device is recommended, wherein the requesting is based on the indication of the recommended replacement.

13. The medium as set forth in claim 11, wherein the received information further comprises information identifying a price of the at least one consumable at each of the identified plurality of suppliers, and further comprising the step of displaying or printing each identified price of the at least one consumable.

14. The medium as set forth in claim 11, wherein the received information further comprises information identifying a location of each of the identified plurality of suppliers, and further comprising the step of displaying or printing each location of the identified plurality of suppliers.

15. The medium as set forth in claim 11, further comprising:
    processing the submitted order; and
    supplying the at least one consumable for the peripheral printing device.

16. The medium as set forth in claim 15, wherein the processing the submitted order further comprises receiving a payment for the at least one consumable.

17. The medium as set forth in claim 11, comprising:
    receiving the request, and
    identifying the plurality of suppliers for the at least one consumable based on the received request.

18. The medium as set forth in claim 17, further comprising retrieving information about the peripheral printing device making the request, wherein the identifying the plurality of suppliers is based on the retrieved information.

19. The medium as set forth in claim 11, further comprising at least one of displaying said received identification information and printing said received identification information.

20. The medium as set forth in claim 11, wherein the peripheral printing device is a device selected from a printer, a copy machine, and a facsimile machine.

21. A system comprising:
a requesting system that requests, with a peripheral printing device via a communications network connected to the peripheral printing device, identity of a plurality of suppliers for the at least one consumable for the peripheral printing device;
a receiving system of the peripheral printing device that receives, via the communications network, information identifying a plurality of suppliers for the at least one consumable in response to the request;
an indication system, with the peripheral printing device, that indicates one of the identified plurality of suppliers; and
an ordering system, with the peripheral printing device, for submitting an order for the at least one consumable to the indicated supplier based on the received information, via the communication network,
wherein the received information identifies a quantity of the at least one consumable at each of the identified plurality of suppliers, wherein the indication system indicates the identified quantity of the at least one consumable.

22. The system as set forth in claim 21, further comprising an indication system that indicates at the peripheral printing device when replacement of one or more of the consumables in the peripheral printing device is recommended, wherein the request by the requesting system is based on the indication of the recommended replacement.

23. The system as set forth in claim 21, wherein the received information further comprises information identifying a price of the at least one consumable at each of the identified plurality of suppliers, and the indication system indicates each identified price of the at least one consumable.

24. The system as set forth in claim 21, wherein the received information further comprises information identifying locations of the identified plurality of suppliers, and the indication system indicates the locations of the identified plurality of suppliers.

25. The system as set forth in claim 21, further comprising an order processing system for processing the submitted order for the at least one consumable for the peripheral printing device.

26. The system as set forth in claim 25, wherein the processing system processes a payment for the at least one consumable.

27. The system as set forth in claim 21, comprising an identification system for receiving the request and identifying the plurality of suppliers for the at least one consumable based on the request.

28. The system as set forth in claim 27, further comprising a retrieval system that retrieves information about the peripheral printing device making the request, wherein the identification system identifies the plurality of suppliers based on the retrieved information.

29. The system as set forth in claim 21, wherein the system comprises at least one of a display for displaying received identification information and a printer for printing received identification information.

30. The system as set forth in claim 21, wherein the peripheral printing device is a device selected from a printer, a copy machine, and a facsimile machine.

* * * * *

UNITED STATES PATENT AND TRADEMARK OFFICE
CERTIFICATE OF CORRECTION

PATENT NO. : 7,663,770 B2 Page 1 of 1
APPLICATION NO. : 10/055189
DATED : February 16, 2010
INVENTOR(S) : Campbell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 980 days.

Signed and Sealed this

Thirtieth Day of November, 2010

David J. Kappos
*Director of the United States Patent and Trademark Office*